United States Patent
Hardy et al.

(10) Patent No.: US 11,551,720 B2
(45) Date of Patent: Jan. 10, 2023

(54) DATA SYNCHRONISATION

(71) Applicant: MUSICJELLY LIMITED, London (GB)

(72) Inventors: Ben Hardy, London (GB); Muñoz-Vicens Zahara, London (GB)

(73) Assignee: MUSICJELLY LIMITED, London (GB)

( * ) Notice: Subject to any disclaimer, the term of this patent is extended or adjusted under 35 U.S.C. 154(b) by 0 days.

(21) Appl. No.: 17/424,353

(22) PCT Filed: Jan. 21, 2020

(86) PCT No.: PCT/GB2020/050136
§ 371 (c)(1),
(2) Date: Jul. 20, 2021

(87) PCT Pub. No.: WO2020/152459
PCT Pub. Date: Jul. 30, 2020

(65) Prior Publication Data
US 2021/0375322 A1    Dec. 2, 2021

(30) Foreign Application Priority Data
Jan. 21, 2019   (GB) ..................................... 1900841

(51) Int. Cl.
*G11B 27/031* (2006.01)
*G11B 27/19* (2006.01)

(52) U.S. Cl.
CPC ............ *G11B 27/031* (2013.01); *G11B 27/19* (2013.01)

(58) Field of Classification Search
CPC .............................. G11B 27/031; G11B 27/19
See application file for complete search history.

(56) References Cited

U.S. PATENT DOCUMENTS

| 2003/0197710 A1* | 10/2003 | Gonsalves | G11B 27/34 345/600 |
| 2009/0249945 A1* | 10/2009 | Yamashita | G10H 1/38 84/612 |

(Continued)

FOREIGN PATENT DOCUMENTS

| GB | 2522644 | 8/2015 |
| WO | WO2013/164661 | 11/2013 |

OTHER PUBLICATIONS

GB Search Report under Section 17(5), dated Jul. 16, 2020.

*Primary Examiner* — Mishawn N. Hunter
(74) *Attorney, Agent, or Firm* — Pierson IP, PLLC

(57) ABSTRACT

The present invention relates to a method and apparatus to synchronise audio and video data. More particularly, the present invention relates to a loop-based audio-visual mixing apparatus and method for synchronising a plurality of videos and their corresponding audio streams to create audio-visual compositions. According to one aspect, there is provided a method for creating a synchronised lineal sequence from multiple inputs of audio and video data, comprising the steps of: providing a first input, comprising audio and video data; providing one or more subsequent inputs, comprising audio and video data; determining at least one rhythm metric unit for each input; queueing the or each subsequent inputs such that the or each subsequent input is triggered at a beginning of a next said rhythm metric unit of a determined input.

17 Claims, 4 Drawing Sheets

(56) References Cited

U.S. PATENT DOCUMENTS

2014/0125867 A1\* 5/2014 Curcio ................ H04N 5/2628
 348/581
2015/0279427 A1 10/2015 Godfrey et al.

\* cited by examiner

DATA SYNCHRONISATION

FIELD

The present invention relates to a method and apparatus to synchronise audio and video data. More particularly, the present invention relates to a clip-based audio-visual mixing apparatus and method for synchronising a plurality of videos and their corresponding audio streams to create audio-visual compositions.

BACKGROUND

The combination of audio and video data can provide a more engaging multimedia experience to a user than either audio or video data alone.

It can be desirable to stream, synchronise and play multiple audio and video clips and their corresponding audio across a range of digital formats and browsers. Conventional browsers do not all support the same formats for videos and audio data.

In particular, multiple audio and video data clips can be of a range of different rhythms and durations which can obstruct synchronisation. Further, users may wish to vary the order of their audio and video clips, and swap them with other video clips with their corresponding audio. This can be both computationally expensive and prone to error, for example the clips can drift out of time with each other and/or freeze.

SUMMARY OF INVENTION

Aspects and/or embodiments seek to provide a method and apparatus for multiple input synchronisation for the playing and swapping of audio-visual clips that stay in time with a determined input.

According to one aspect, there is provided a method for creating a synchronised lineal sequence from multiple inputs of audio and video data, comprising the steps of: providing a first input, comprising audio and video data; providing one or more subsequent inputs, comprising audio and video data; determining at least one rhythm metric unit for each input; queueing the or each subsequent inputs such that the or each subsequent input is triggered at a beginning of a next said rhythm metric unit of a determined input.

Video data, particularly in combination with audio data, can be computationally expensive to process and use up a significant proportion of available bandwidth and processing power of a computer system. Video and audio data streams can drift out of time and/or freeze. Further, the streams may not load or buffer at the same time, making the experience a frustrating experience for a user and result in a chaotic audio-visual cacophony.

One embodiment aligns the audio and video of a single clip, but it is appreciated that mixing the separated data input to mix them up and create new clips may be performed in an alternative embodiment.

Modern browsers do not all support the same formats for videos and audio tracks, which can complicate the process of cross-browser synchronisation. It is therefore desirable to create a synchronised lineal sequence from multiple inputs of audio and video data, which can be created, recorded and/or shared across a range of platforms, to the alignment of the same instantaneous rhythm metric for all of the inputs.

Optionally, the determined input is derived from one or more of: the first input; the one or more subsequent inputs; and/or a user defined input.

Although a default position might be to synchronise the plurality of inputs with the first input, it is appreciated that a range of options may be available. In particular, the user could choose the determined input in order to synchronise their overall composition to a subsequently added clip, or to a tempo they define themselves. The determined input could further be chosen in advance, or changed during the process of forming a composition.

Optionally, the first and/or subsequent inputs are looped. Optionally, the first and/or subsequent inputs are provided in the form of one or more simultaneous channels. Optionally, the number of simultaneous channels is between one and six.

Looping a clip can be a useful means for extending the play time of a clip, as well as providing a sense of rhythm and regularity for the user. The looping may occur within a singular channel, or when the input is added to a different channel. When a clip is looped, it may be referred to as a "loop".

Optionally, the rhythm metric unit comprises one or more beats per minute (BPM). Optionally, a time signature is determined for each input. Optionally, the length of a bar is determined for each input.

Such metrics are a well known means in the art of ascertaining useful qualities about a section of audio.

Optionally, the beginning of the next said rhythm metric unit of the determined input is at the beginning of a bar. Starting each new clip at the beginning of a bar can provide a good point of synchronicity.

Optionally, the audio data and video data are separated before the rhythm metric for each input is determined.

The separation of audio and video data can provide a more efficient processing of a plurality of clips, as well as a more reliable synchronised end product. Any tempo metadata can be included in the two data tracks (specifically, audio and video) of the clip. The tempo of a session can be predetermined by the user, where a session refers to a project of the user.

Optionally, the first and/or subsequent inputs comprise one or more of: 2-dimensional (2D) video data; holographic data; 3-dimensional (3D) video data, and/or virtual reality data. A user may wish to select a range of clips of different data types to be synchronised.

Optionally, at least a portion of data from the first input and/or any subsequent inputs may be pre-loaded onto one or more of: a random access memory (RAM) of a computer; or a digital memory cache; and/or a local storage disk. Optionally, the portion of data comprises video data.

Each clip may be short in length, for example between 0-30 seconds, or more preferably between 5-15 seconds, allowing for a more rapid pre-loading time and a more rapid processing in due course.

Optionally, there is provided an output mechanism for generating and outputting a composition comprising data from the first input and one or more subsequent inputs. Optionally, the generating and outputting of the composition is performed in real time.

A user may wish to review, disseminate, or otherwise display and share their composition. Therefore such an output mechanism can provide a means for doing so, and if done in real time can allow a user to make adjustments to the composition more efficiently.

Optionally, the first input and/or any subsequent inputs and/or the composition are stored in a database. Optionally, the or each input and/or the composition stored in the database is given a unique identification code. The database may be in the form of one or more of: a library; a temporary storage module; a palette; a cloud-based database; a cache-based database; a local database; and/or a preselection of data inputs.

Optionally, there is provided the use of a timing algorithm operable to check that the or each subsequent input is triggered at the beginning of the next said rhythm metric unit of the determined input. Optionally, the timing algorithm is operable to perform at least 40 checks per second. Optionally, the timing algorithm is in use throughout the creation of the synchronised lineal sequence.

The timing algorithm, also referred to as a master timer, can provide a useful method of checking that the synchronicity of a plurality of inputs remains within a predefined tolerance.

According to a further aspect, there is provided a computer program product operable to perform the method as disclosed herein. According to a further aspect, there is provided an apparatus operable to perform the method and/or comprise the computer program product disclosed herein.

BRIEF DESCRIPTION OF DRAWINGS

Embodiments will now be described, by way of example only and with reference to the accompanying drawings having like-reference numerals, in which.

SPECIFIC DESCRIPTION

Figure 1:
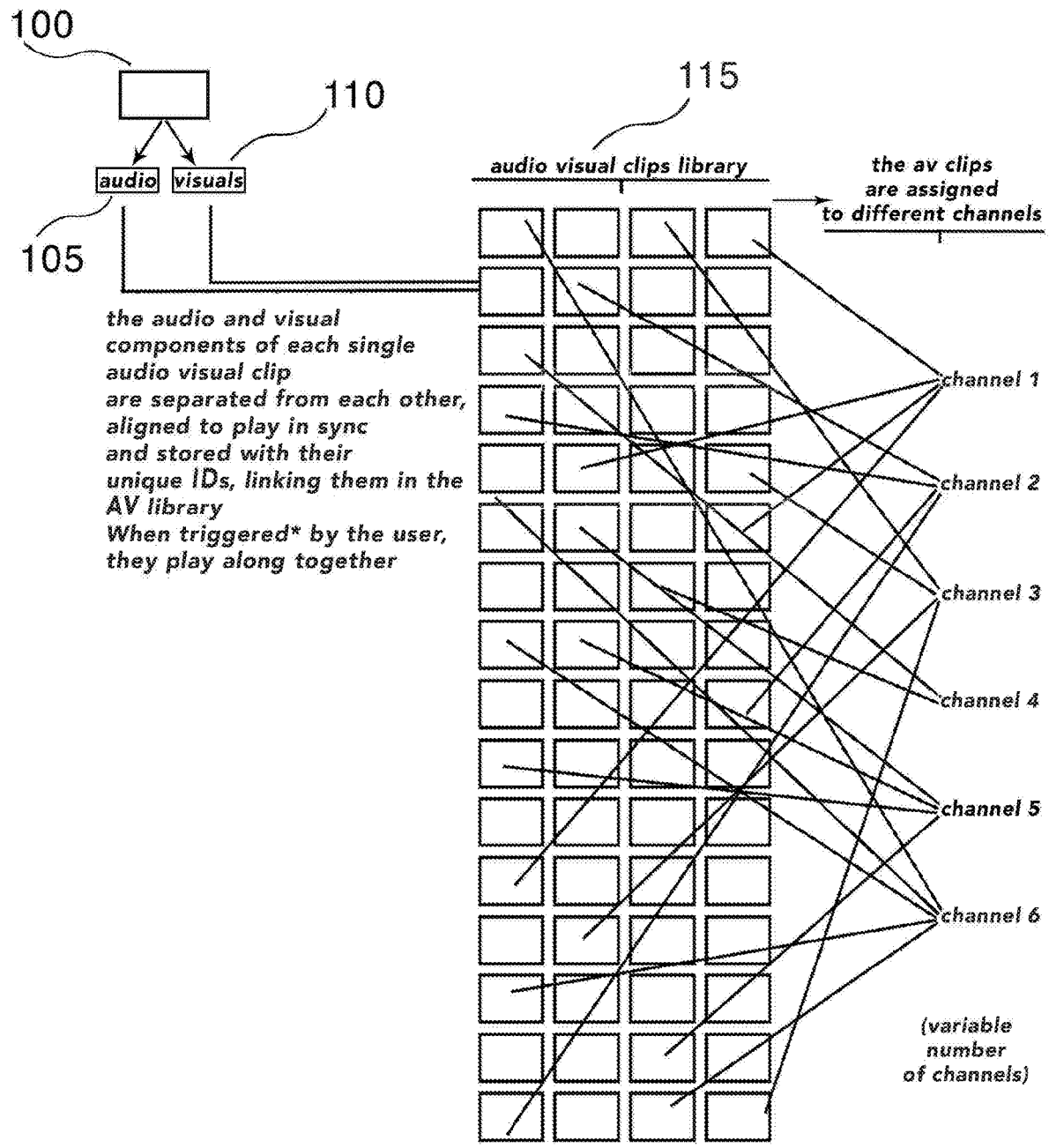
FIG. 1 shows the importation of audio-visual data into a database.
Figure 2:
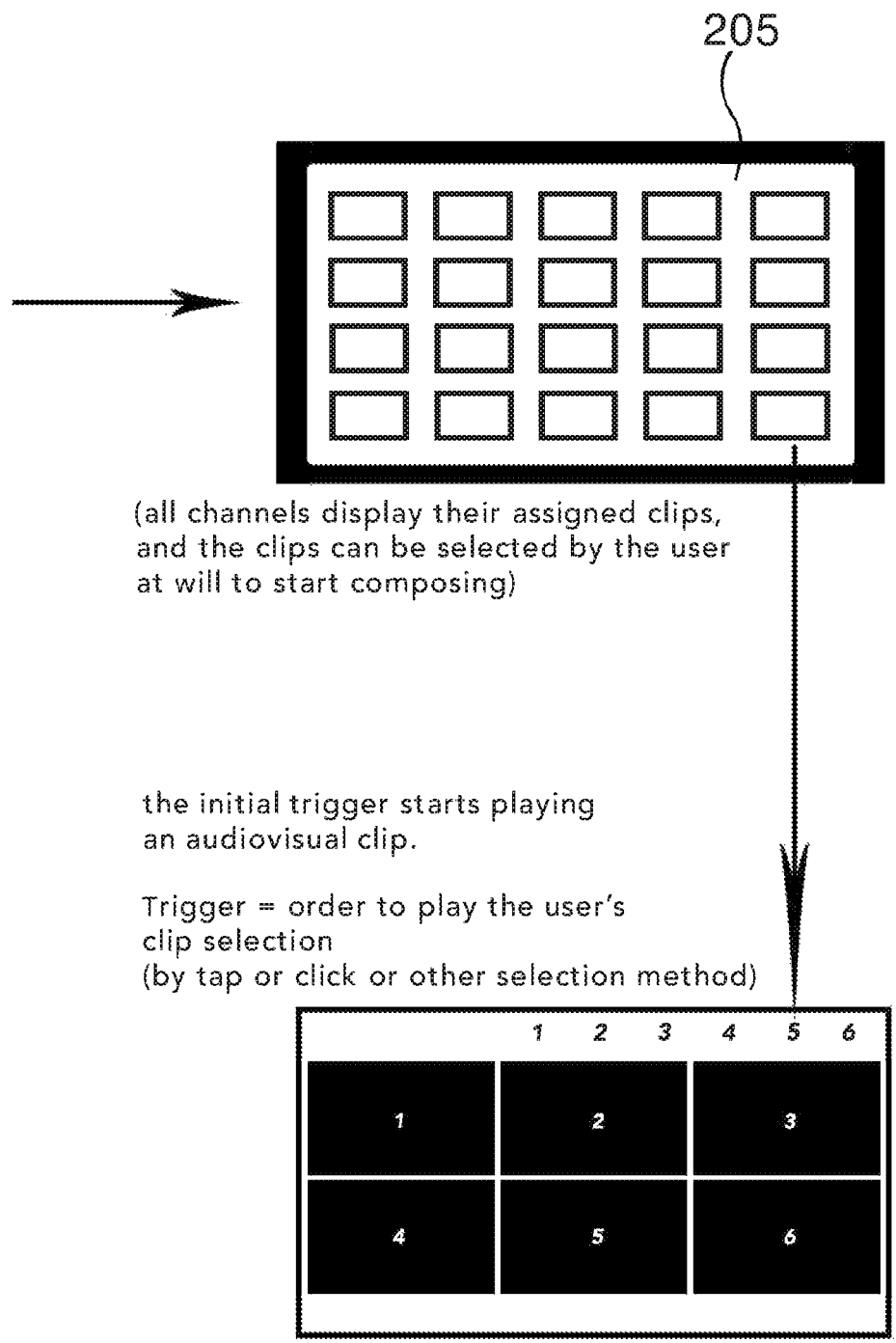
FIG. 2 shows the selection of one or more audio-visual loops.
Figure 3:
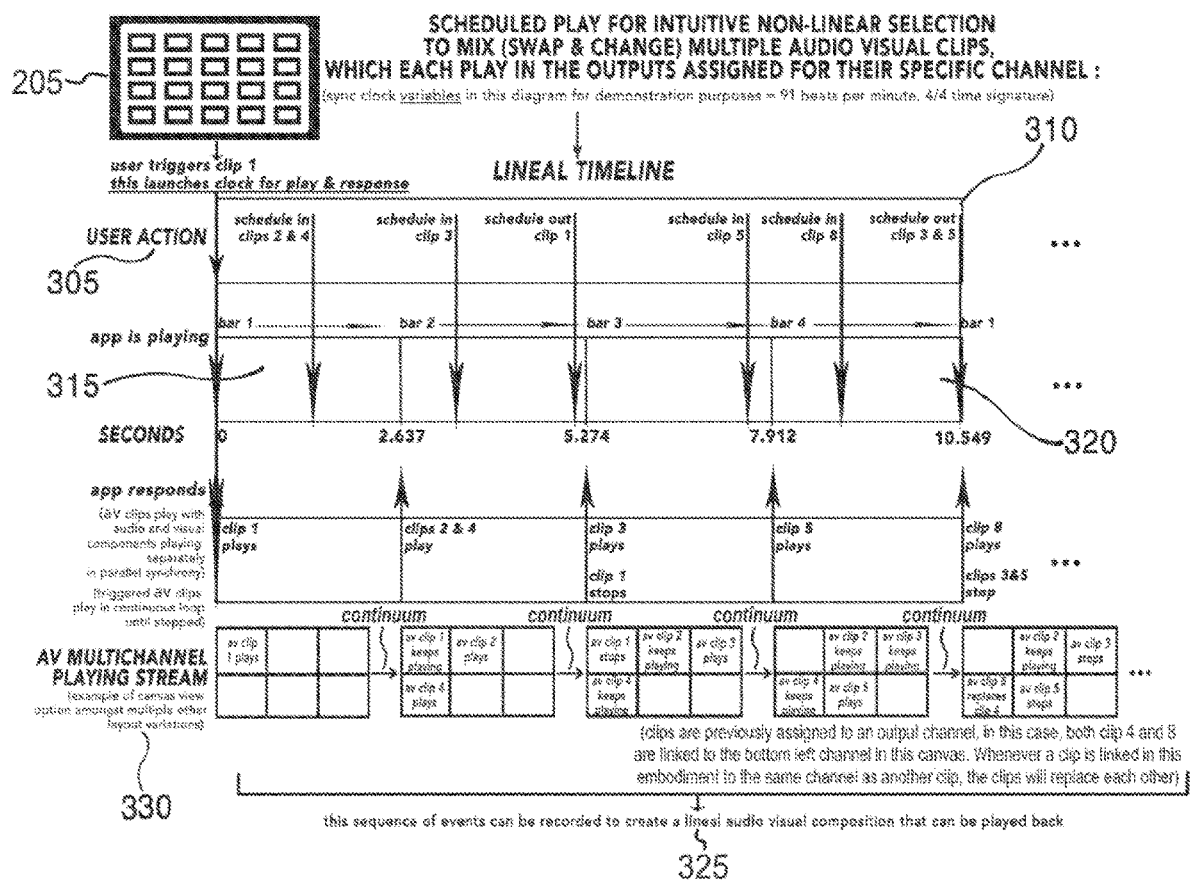
FIG. 3 shows a queueing arrangement of loops to be played.

With reference to FIGS. 1 to 3, a first embodiment will now be described. An audio-visual loop 100, is selected. The loop 100 may comprise data of a range of formats, for example: 2-dimensional (2D) video data; holographic data; 3-dimensional (3D) video data, and/or virtual reality data.

For efficiency of processing, the loop 100 in this embodiment is separated into an audio component 105 and a visual component 110. The audio component 105 and the visual component 110 of each loop 100 are separated from each other. Each component 105, 110 is then aligned to synchronise with each other such that when triggered by a user the audio component 105 and the visual component 110 play together as intended by a user. The components 105, 110 are then stored with a unique identification code in a database 115 also referred to as a library 115.

In this embodiment, six channels are made available for a user. It is appreciated that more or fewer channels may be made available to a user, for example depending on computational constraints. Each channel may comprise one or more selected loops from the library 115.

The loops 100 assigned to each channel are displayed to the user on an interface 205. Each loop 100 can then be selected by the user to begin their composition. The initial trigger of a first loop 100 being selected, for example by a user tapping the relevant part of a touchscreen display, starts the first loop 100 being played. This launches a timer operable to start any subsequent loops 100 at the correct time to ensure continuous synchronicity. For example, any subsequent loops 100 may be queued until the beginning of a bar as defined by the rhythm of the first loop 100.

The user action 305 triggers the playing of a first loop 100. The loops 100 are scheduled 310 with relation to one or more start or stop points. Each loop may be separately started or stopped without replacement if so instructed by a user. In this embodiment, the first loop 100 comprises audio-visual data with a tempo of 91 beats per minute (BPM), with the time signature of 4/4. Each loop 100 in this example comprises four bars of audio.

In this specific setup example, if the loop 100 is 91 BPM with a time signature of 4/4, the length of each beat ("L") is:

$$L = \frac{60 \text{ seconds}}{91 \text{ BPM}} = 0.659 \text{ seconds(3 decimal places)}$$

Therefore because in this example there are 4 beats in every bar, the length of each bar ("B") 315 is:

$$B = 0.659 * 4 = 2.637 \text{ seconds}$$

For the embodiment where any subsequent inputs are triggered at a beginning of a next bar of the first input, a central timer (also referred to as a "master timer") would queue any new loops triggered by the user after the previous bar. So for first and second input loops 100, where the second input loop 100 is selected during a first bar of the first input loop 100 and within the 2.637 seconds leading to the next bar, the second input loop 100 will be played together simultaneously with the first input loop 100, 2.637 seconds after the first bar and hence at the beginning of the second bar.

Equally, a user could select new loops after the second bar and before or on the third bar and the master timer would queue the loops to play simultaneously on the third bar. In this example, the length of a four-bar loop ("F") 320:

$$F = 4 * 2.637 \text{ seconds} = 10.549 \text{ seconds}$$

Therefore the full loop length is approximately 10.5495 seconds.

If a loop was triggered in the first bar it would continue to play until the end of the fourth bar, in this instance 10.549 seconds. If the loop was not replaced by another loop in this time, the master timer would then repeat the same loops after 10.549 seconds and continue to do so every 10.549 seconds until they were stopped or replaced.

The sequence of events as disclosed herein can be recorded to create a synchronised lineal audio-visual composition 325, that can be played back. To allow for more understandable user experience, a view of such events may be provided to a user through an audio-visual multichannel playing stream 330.

In one embodiment, a schedule is provided operable to queue one or more selected loops but only trigger the playing of said loops at the beginning of a new bar as defined by the rhythm of the first loop. However in an alternative embodiment, the schedule is provided wherein the loops selected are operable to be triggered to be played immediately upon selection. Multiple inputs may be triggered to start simultaneously.

Figure 4:
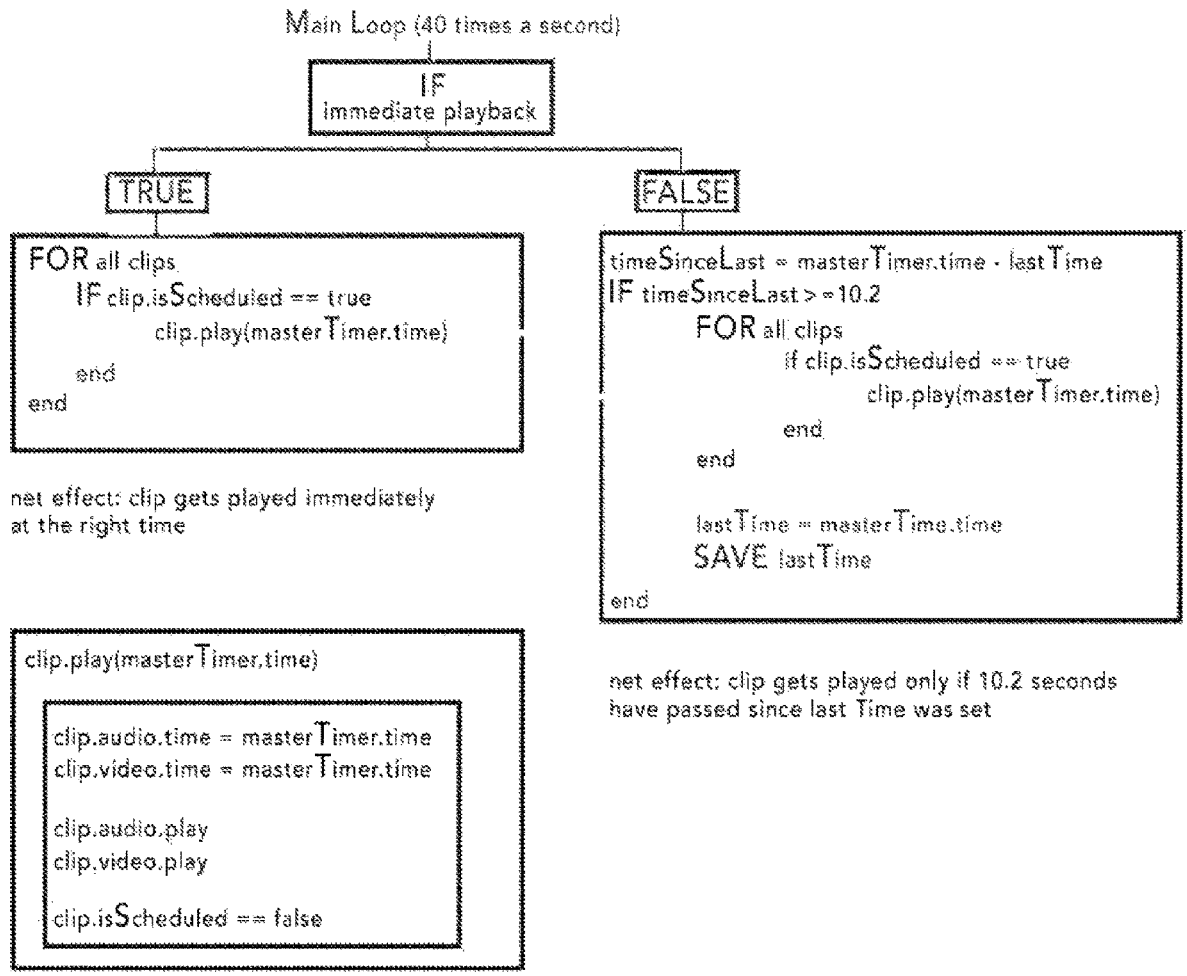
FIG. 4 shows a decision tree for a timer process.

In one embodiment, the audio and video synchronisation apparatus and method comprise the use of a timing arrangement referred to herein as the master timer, as shown diagrammatically in FIG. 4. The master timer enables users to play multiple audio-visual loops at the same time and swap them with other audio-visual loops in real time to all play together in a synchronised form in a multi-channel canvas.

The master timer can be formatted to operate consistently across a range of digital platforms, for example: iOS and similar mobile platforms; online (for example using JavaScript); and on a desktop PC (for example using C++).

The embodiment disclosed herein can provide one or more of the following three options:
i) The audio and the video data can be separated. This reduces the computational expense of the synchronisation process. Custom back end processes have been developed to take master audio-visual input files and split them into separate audio and video data tracks, as well as convert the data into one or more formats to support a greater range of conventionally available browsers. A custom database has been designed to store references to the original audio and visual data (also referred to as a "unique loop identifier") and to each variant generated.
ii) At least a portion of the video data may be pre-loaded onto random access memory (RAM) of a computer being used to perform the synchronisation. In this embodiment, the audio and video data loops are between 0-15 seconds long, allowing a more rapid load time.
iii) A master timer can be provided comprising a custom timing algorithm written to ensure all playing tracks are kept in sync with each other and hence loop substantially perfectly. For other embodiments of the master timer, for example as an online version, the JavaScript version can comprise a command that allows a user to say when they want the next event to be triggered, and the master timer can ensure that such an event is fired at exactly the selected time.

The "triggering" of an event can refer to activating or launching one or more items of looped audio-visual data. The moment the user selects the loops by, for example, clicking on them using a computer mouse, or tapping on them using a touch screen or by any other selection method, the user thereby activates the audio-visual data loop which is queued to play. The master timer may be operable to queue the loops to play at the beginning of each bar so if the user triggers loops exactly at the beginning of a bar they will play immediately, otherwise they will wait until the next bar to allow intuitive play simultaneously and without tempo clashes. In this context a bar is a segment of time dictated by the time signature and tempo a user or the system has chosen for an individual piece of audio-visual data. It is therefore understood that the number of seconds per bar are a variable.

However it is appreciated that although a sequence of points in time can be determined that indicate the beginning or end of each bar and only loops are only started at the beginning of each bar, the intervals between the loops being started could be of any time duration. For example, the intervals could be every quarter bar so that the loops only start at the beginning of each quarter bar.

In a further example, a user can manually set a time signature and the tempo for their own work. A user could set the time signature for 4/4 and the tempo for 60 BPM. In this instance each beat would be:

60 BPM÷60 seconds=1 second long

Each bar would therefore be:

4*1 second long=4 seconds

If a user triggered the loops exactly at the beginning of the first bar, they would play immediately. If a user triggered the loops just after the beginning of the first bar, and within the 4 seconds leading up to the second bar, the master timer would queue the loops until the second bar and the loops would then all play simultaneously at the beginning of the second bar.

Equally, a user could select new loops after the second bar and before or on the beginning of the third bar and the master timer would queue the loops to play simultaneously at the beginning of the third bar.

In this example a 4-bar loop=4×4 seconds=16 seconds. If a loop was triggered in at the beginning of the first bar it would continue to play until the end of the fourth bar which in this case would be for a total duration of 16 seconds. If the loop was not replaced by another loop in this time, the master timer would then repeat the same loops after 16 seconds and continue to do so every 16 seconds until they were stopped or replaced.

The loops themselves can contain metadata that includes the original tempo and pitch. If the user selects or imports a loop of a different tempo, the user may then be prompted to ascertain whether they wish to import the loop with its original tempo or adjust the loop to match an existing or preselected tempo using compression and/or expansion.

For example, if a loop was selected that had 50 BPM and the tempo of the existing sequence was 91 BPM, a pop-up window would materialise to flag to the user that the loop was of a different tempo to the session, and ask the user if they would like to import the loop to match the session tempo or import with the current tempo. If the user selected to match the loop to the session tempo the video and audio data of the loop would be adjusted accordingly to the chosen length. If the loop was chosen to be imported with its own tempo, for example if the loop in this instance would be longer than the loops in the session, a warning message may be generated saying "this loop does not match the session tempo and may be clipped" and the loop would play to the length specified for the session and then restart. Alternatively, the user could select an option to adjust the session length to match the newly introduced one or more loops.

In one embodiment, for example the embodiment used for a desktop computer installation, the master timer can be arranged to loop 40 times a second. This performs the function of checking that the synchronisation remains correct 40 times a second.

The master timer is operable to organise the synchronised playback of multiple channels of audio and video data. All selected data that are not scheduled to play immediately may be placed in a queue to play when appropriate. In one embodiment, the queued data may be automatically triggered to being on the start of the next bar.

A user can thereby form a large number of different permutations and create synchronised sequences in any order and elaborate full audio-visual compositions based on a plurality of audio and visual data streams. Such a sequence may be formed without the need for powerful computers or mobile devices, or a fast Internet connection.

There is also provided herein a sequencer arrangement. The sequencer is operable to record all the actions made by the user when interacting with the loop-based audio-visual mixing player described herein, and then play those interactions back in the same order.

The sequencer is operable to register all the actions of a user as a sequence of events, as they can be displayed on a multi-channel canvas. The user can create a sequence of audio-visual loops, including accessing new audio-visual loops from a database (also referred to as a library) in real time and then play them back in the same order and timing as originally triggered by the user. Such triggering may be prompted by the user directly, or partially or entirely automated.

Conventional audio and video data can require a significant amount of storage capacity in a database. Rendering a new video each time a user wanted to create a full-length synchronised sequence out of a combination of multiple audio and video streams, would require a significant amount of time to render the video, use up a significant amount of storage space, increase the costs at a commensurate rate. Further, every time the user wanted to make changes to their own sequence, or remix a previously created sequence, an entirely new sequence would have to be generated, thereby taking out the spontaneity and making the whole process slow, unmanageable and unscalable.

The use of the sequencer disclosed herein alleviates such issues. The sequencer records the initial state of the player and all the actions the user takes while recording, for example: play loop, stop loop; and/or stop all loops. Rather than uploading the composition as video and audio files, the sequence comprises one or more unique loop identifiers, their original location, and the events required by the user.

Using such a method, a large number of sequences can be stored, either in a cloud-based remote storage solution or locally in installations that may have limited access to the Internet, all while using minimal storage space. It also means the sequences can be played back almost immediately and remixed.

This approach also allows users to take any part of a composition and play it back in any order, and/or render at least a portion of the composition as video and/or audio data.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The following is a non-exhaustive list of numbered aspects which may be claimed:

1. A method for creating a synchronised lineal sequence from multiple inputs of audio and video data, comprising the steps of:
   providing a first input, comprising audio and video data;
   providing one or more subsequent inputs, comprising audio and video data;
   determining at least one rhythm metric unit for each input;
   queueing the or each subsequent inputs such that the or each subsequent input is triggered at a beginning of a next said rhythm metric unit of a determined input.
2. The method of aspect 1, wherein the determined input is derived from one or more of: the first input; the one or more subsequent inputs; and/or a user defined input.
3. The method of any preceding aspect, wherein the first and/or subsequent inputs are looped.
4. The method of any preceding aspect, wherein the first and/or subsequent inputs are provided in the form of one or more simultaneous channels.
5. The method of aspect 4, comprising between one and six simultaneous channels.
6. The method of any preceding aspect, wherein the rhythm metric unit comprises one or more beats per minute (BPM).
7. The method of aspect 6, further comprising determining a time signature for each input.
8. The method of aspect 7, further comprising determining the length of a bar for each input.
9. The method of aspect 8, wherein the beginning of the next said rhythm metric unit of the determined input is at the beginning of a bar.
10. The method of any preceding aspect, wherein the audio data and video data are separated before the rhythm metric for each input is determined.
11. The method of any preceding aspect, wherein the first and/or subsequent inputs comprise one or more of: 2-dimensional (2D) video data; holographic data; 3-dimensional (3D) video data, and/or virtual reality data.
12. The method of any preceding aspect, further comprising the step of pre-loading at least a portion of data from the first input and/or any subsequent inputs onto one or more of: a random access memory (RAM) of a computer; or a digital memory cache; and/or a local storage disk.
13. The method of aspect 12, wherein the portion of data comprises video data.
14. The method of aspect 12, further comprising:
   generating and outputting a composition comprising data from the first input and one or more subsequent inputs.
15. The method of aspect 14, wherein the generating and outputting of the composition is performed in real time.
16. The method of aspect 14 or 15, wherein the first input and/or any subsequent inputs and/or the composition are stored in a database.
17. The method of any one of aspects 14 to 16, wherein the or each input and/or the composition stored in the database is given a unique identification code.
18. The method of any preceding aspect, further comprising the use of a timing algorithm operable to check that the or each subsequent input is triggered at the beginning of the next said rhythm metric unit of the determined input.
19. The method of aspect 18, wherein the timing algorithm is operable to perform at least 40 checks per second.
20. The method of aspect 18 or 19, wherein the timing algorithm is in use throughout the creation of the synchronised lineal sequence.
21. A computer program product operable to perform the method of any one of aspects 1 to 20.
22. An apparatus operable to perform the method and/or comprise the computer program product of any preceding aspect.

The invention claimed is:

1. A method for creating a synchronised sequence from multiple inputs of audio and video data, the method comprising:
   providing a first input, comprising audio and video data;
   providing one or more subsequent inputs, comprising audio and video data;
   determining at least one rhythm metric unit for the first input and the one or more subsequent inputs;
   queueing the one or more subsequent inputs such that the one or more subsequent inputs is triggered at a beginning of a next said rhythm metric unit of a determined input;
   providing a timing algorithm operable to check that the one or more subsequent inputs are triggered at the beginning of the next said rhythm metric unit of the first input; and receiving a user selection of the one or more subsequent inputs, and generating and outputting a composition comprising data from the first input and the user selected one or more subsequent inputs, wherein the first input and the user selected one or more subsequent inputs are played simultaneously.

2. The method of claim 1, wherein the determined input is derived from one or more of: the first input; the one or more subsequent inputs; and/or a user defined input.

3. The method of claim 1, wherein the first and/or subsequent inputs are looped.

4. The method of claim 1, wherein the first and/or subsequent inputs are provided in the form of one or more simultaneous channels.

5. The method of claim 1, wherein the rhythm metric unit comprises one or more beats per minute, BPM.

6. The method of claim 5, further comprising:
determining a time signature for the one or more subsequent inputs.

7. The method of claim 6, further comprising:
determining the length of a bar for the one or more subsequent inputs.

8. The method of claim 6, wherein the beginning of the next said rhythm metric unit of the determined input is at the beginning of a bar.

9. The method of claim 1, wherein the first and/or subsequent inputs comprise one or more of: 2-dimensional (2D) video data; holographic data; 3-dimensional (3D) video data, and/or virtual reality data.

10. The method of claim 1, further comprising:
pre-loading at least a portion of data from the first input and/or any subsequent inputs onto one or more of: a random access memory (RAM) of a computer; or a digital memory cache; and/or a local storage disk, wherein the portion of data includes video data.

11. The method of claim 1,
wherein the generating and outputting of the composition is performed in real time.

12. The method of claim 11, wherein the first input and/or any subsequent inputs and/or the composition are stored in a database.

13. The method of claim 11, wherein the one or more subsequent inputs and/or the composition stored in the database is given a unique identification code.

14. The method of claim 11,
wherein the timing algorithm performs at least 40 checks per timing second.

15. A non-transitory computer-readable medium comprising instructions which, when the program is executed by a computer, cause the computer to carry out the method of claim 1.

16. A data processing apparatus comprising means for carrying out the method of claim 1.

17. A method for creating a synchronised sequence from multiple inputs of audio and video data, the method comprising:
providing a first input, comprising audio and video data;
providing one or more subsequent inputs, comprising audio and video data;
determining at least one rhythm metric unit for the first input and the one or more subsequent inputs;
queueing the one or more subsequent inputs such that the one or more subsequent input is triggered at a beginning of a next said rhythm metric unit of a determined input;
providing a timing algorithm operable to check that the one or more subsequent inputs are triggered at the beginning of the next said rhythm metric unit of the first input; and
receiving a user selection of the one or more subsequent inputs, and generating and outputting a composition comprising data from the first input and the user selected one or more subsequent inputs, wherein the first input and the user selected one or more subsequent inputs are played simultaneously, wherein the audio data and video data are separated before the rhythm metric unit for the one or more subsequent inputs is determined.

* * * * *